(12) United States Patent
Gaas

(10) Patent No.: US 9,211,842 B2
(45) Date of Patent: Dec. 15, 2015

(54) CARGO FLOOR FOR A VEHICLE

(71) Applicant: Volkswagen Aktiengesellschaft, Wolfsburg (DE)

(72) Inventor: Matthias Gaas, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 14/555,892

(22) Filed: Nov. 28, 2014

(65) Prior Publication Data

US 2015/0145273 A1   May 28, 2015

(30) Foreign Application Priority Data

Nov. 28, 2013   (DE) .......................... 10 2013 224 467

(51) Int. Cl.
 *B60N 3/12*   (2006.01)
 *B60R 5/04*   (2006.01)

(52) U.S. Cl.
 CPC .. *B60R 5/045* (2013.01); *B60R 5/04* (2013.01)

(58) Field of Classification Search
 CPC ............... B60R 5/04; B60P 3/40; B60P 1/02; B60P 1/025; B60P 7/0807; B64C 1/20; B64C 2001/0027; B64D 9/00; B65G 67/606; B01D 17/0211
 USPC .............. 296/37.16, 183.1, 184.1, 37.6, 39.1, 296/39.2; 220/1.5; 244/118.1, 137.1
 See application file for complete search history.

(56) References Cited

U.S. PATENT DOCUMENTS

| | | | | |
|---|---|---|---|---|
| 2,898,146 A * | 8/1959 | Yudenfreund | .......... | B60R 13/01 296/39.1 |
| 5,322,335 A * | 6/1994 | Niemi | ................. | B60N 2/6009 296/39.1 |
| 5,570,921 A * | 11/1996 | Brooker | .................... | B60R 5/04 224/542 |
| 5,830,560 A * | 11/1998 | Koa | ....................... | B60N 3/044 296/97.23 |
| 5,839,773 A * | 11/1998 | Ban | ...................... | B60N 2/3011 296/65.09 |
| 5,979,964 A * | 11/1999 | Ban | ...................... | B60N 2/3011 296/65.09 |
| 6,095,585 A | 8/2000 | Pilhall | | |
| 6,406,085 B1 * | 6/2002 | Stanesic | .................. | B60R 5/045 296/39.1 |
| 7,182,374 B2 | 2/2007 | Figge et al. | | |
| 7,226,100 B1 * | 6/2007 | Willey | ................... | B62D 33/03 296/26.11 |
| 7,600,800 B2 * | 10/2009 | Suzuki | ..................... | B60R 5/04 296/37.14 |
| 2006/0255611 A1 * | 11/2006 | Smith | ...................... | B60N 2/36 296/37.16 |

(Continued)

FOREIGN PATENT DOCUMENTS

DE   198 02 077 A1   8/1998
DE   103 33 354 A1   3/2005

(Continued)

*Primary Examiner* — Kiran B Patel
(74) *Attorney, Agent, or Firm* — Muncy, Geissler, Olds & Lowe, P.C.

(57) ABSTRACT

A cargo floor for a vehicle having a first section and at least one second section, which is arranged behind the first section in the direction of travel, whereby the second section is connected to the first section in an articulated manner and pivotable about an axis, and a closure member, whereby at least one part of the cargo floor can be fastened releasably via the closure member to the vehicle. The cargo floor in an unlocked state of the closure member can be removed from the vehicle, whereby the first section and the second section in the fastened state are arranged in the same plane, and whereby the first section of the cargo floor can be locked via the closure member.

12 Claims, 5 Drawing Sheets

(56) References Cited

U.S. PATENT DOCUMENTS

| | | | |
|---|---|---|---|
| 2008/0178428 A1* | 7/2008 | McDonald | B60R 7/04 16/344 |
| 2010/0187857 A1* | 7/2010 | Fischer | B60R 5/045 296/184.1 |
| 2012/0261935 A1* | 10/2012 | Perez | B60R 5/048 296/24.4 |
| 2013/0257094 A1* | 10/2013 | McCloud | B62D 25/2054 296/184.1 |
| 2014/0265411 A1* | 9/2014 | Thota | B60N 2/36 296/37.16 |

FOREIGN PATENT DOCUMENTS

| | | |
|---|---|---|
| DE | 10 2007 020 924 A1 | 11/2008 |
| EP | 1 528 197 A1 | 5/2005 |
| EP | 2 095 997 A1 | 9/2009 |
| EP | 2 226 219 A1 | 9/2010 |
| EP | 2 287 045 A2 | 2/2011 |
| JP | 61-75035 A | 4/1986 |
| JP | 62-68153 A | 3/1987 |
| JP | 2007-203977 A | 8/2007 |

* cited by examiner

CARGO FLOOR FOR A VEHICLE

This nonprovisional application claims priority under 35 U.S.C. §119(a) to German Patent Application No. 10 2013 224 467.3, which was filed in Germany on Nov. 28, 2013, and which is herein incorporated by reference.

BACKGROUND OF THE INVENTION

1. Field of the Invention

The invention relates to a cargo floor for a vehicle, having a first section and at least one second section, which is arranged behind the first section in the direction of travel, whereby the second section is connected to the first section in an articulated manner and pivotable about an axis, and a closure member, whereby at least one part of the cargo floor can be fastened releasably via the closure member to the vehicle, and whereby the cargo floor in an unlocked state of the closure member can be removed from the motor vehicle.

2. Description of the Background Art

EP 2 226 219 A1 describes a cargo floor for a motor vehicle, in which a front section is arranged vertically in a guide and a section connected thereto in the back is arranged horizontally. The sections of the cargo floor are connected together in an articulated manner, whereby when being laid down the back section actuates a lock, which works together with the front section.

DE 198 02 077 A1 describes a trunk cover for a motor vehicle, wherein a manually actuatable closure is arranged at a transverse edge of a rearmost of a number of sections foldable one on top of the other.

SUMMARY OF THE INVENTION

It is therefore an object of the invention to provide a removable cargo floor for a vehicle, particularly for a motor vehicle, whereby the floor is simple to operate.

These and further objects are achieved for an aforementioned cargo floor according to an embodiment of the invention by a cargo floor that includes a first section and at least one second section, which is arranged behind the first section in the direction of travel of the vehicle. The second section can be connected to the first section in an articulated manner and pivotable about an axis. A closure member can also be provided. At least one part of the cargo floor can be fastened releasably via the closure member to the vehicle, whereby the cargo floor in an unlocked state of the closure member can be removed from the vehicle, whereby the first section and the second section in the fastened state are arranged in the same plane, and whereby the first section of the cargo floor can be locked via the closure member.

By the arrangement of the sections in the same plane, the closure member can be placed close to a back access of the vehicle, which simplifies the accessibility of the closure member and its operation.

The locking of the first section via the closure member enables a simple removal process. In an embodiment, the second section, which is arranged behind the first section in the direction of travel, can be raised and/or folded over without releasing a closure member. A compact stack, previously folded on top of one another, of cargo floor sections can be detached from the vehicle by the releasing of the closure member.

A cargo floor having a plurality of sections can be, for example, a flat covering, removable from the vehicle, which in most cases is arranged in a back storage area ("cargo space," "trunk"). At least two sections can be connected together in an articulated manner. This can occur in a simple way, for instance, by a continuous, sufficiently bendable floor covering under which at least two reinforcing areas are arranged, between which the floor covering acts like an integral hinge. For example, the one section can be folded by 180° onto the other section. Other sections can be provided in general, which are also foldable. For example, there can be three sections which fold on top of one another in the manner of a Z-fold.

In the folded together state, there can be a defined intermediate state of the cargo floor in which the packet of cargo floor sections can be easily removed from the vehicle. As an alternative to removal, however, loading or normal vehicle operation can also occur in the intermediate state, for instance, to utilize a vehicle area located under the cargo floor for loading, without the cargo floor having to be completely removed.

A closure member within the context of the invention can be understood to be any component or device by which the cargo floor can be fastened releasably to the vehicle, particularly by a lock acting form-fittingly. A closure member within the context of the invention can be changed, for example, by an operating person from a locked state to an unlocked state. Preferably, in the locked state there is a form-fitting connection of the cargo floor to the vehicle via the lock, whereby the form closure acts at least in a vertical direction of the vehicle, but, for example, in all spatial directions.

Fixing aids with an adhesive action such as, for instance, Velcro strips, adhesive strips, or the like can be provided in addition as required.

The plane in which the cargo floor sections are mutually arranged can have a substantially horizontal orientation. However, it can also have a slight tilt relative to the horizontal. The sections of the cargo floor need not be arranged in the same plane in a geometrically strict sense, but depending on the configuration of the rear of the vehicle can also have a small angle to one another. In an exemplary embodiment, such an angle is not greater than 20 degrees, or not greater than 10 degrees.

In the interest of a secure fastening, in an embodiment, a closure member is provided on each side of the cargo floor. A side of the cargo floor in this case can be understood to be an outer boundary of the cargo floor in a transverse direction of the vehicle. A cargo floor according to such an embodiment therefore comprises at least one closure member on the left-hand side and one on the right-hand side.

In an embodiment of the invention, the first section can be brought into a laid-down position or can be removed from this position, whereby at least the second section in a folded position lies on the first section. This enables an especially easy removal and opens up further options for loading in this intermediate state.

In an embodiment, a coupling element interacting with the closure member can be arranged on the second section. The coupling element can act in a simple manner as a moving actuating element for the closure member, while the back cargo floor section can be folded in its regular position. As a result, in particular a separate step of locking the closure member by the operating person becomes unnecessary. In this regard, the coupling element can project over a planar surface of the second section.

In an embodiment of the invention, the closure member can include a linearly movable locking member. Such locking members are mechanically robust, can be produced at reasonable cost, and can be easily operated. In an embodiment, the closure member thereby does not have any parts pivotable about an axis.

A simplified operation of the locking member is achieved in that the locking member can have a catch for the manual sliding of the locking member by an operating person. This type of catch can be, for example, a recess, a projection, or a specifically shaped, grooved area of a surface, for example. The catch can be visible or can be reached by the operating person only when the back cargo floor section is swung upward from its laid-down position.

For a simple realization of the closure member of the invention, the locking member in an embodiment of the invention has a retaining section, which in the fastened state meshes with one of the cargo floor sections. This can be a hook-like shape or a similar design. The retaining section can engage in a simple manner, for example, in a recess on a side edge of the cargo floor section. The cargo floor section to this end can have on its edge a profile part made of metal or plastic, for example. The profile part in this case can simultaneously effect a reinforcing, edge-closing, and locking-enabling function for the cargo floor section.

In an embodiment of the invention, the locking member can be held by means of a latching force in at least one end position. This offers a haptic improvement and assures at least in an unfolded intermediate state of the cargo floor that the cargo floor remains locked also under mechanical influences on the locking member, especially while the vehicle is being driven. For the same reasons, it can be provided alternatively or in addition that force is applied by means of a spring to the locking member in one direction.

In general, the cargo floor can lie on at least one frame section fixed to the vehicle body, whereby the locking member is taken up in the frame section. As a result, the cargo floor can be installed easily and with saving of space in the vehicle and its mounting can be adapted to different vehicles at little cost. In particular, essential elements of the closure member can be formed as identical parts. The frame sections can be connected releasably or permanently to the vehicle body.

It is understood very generally that a cargo floor of the invention normally, but not necessarily, has two closure members, whereby each closure member is arranged at a left or right edge of the cargo floor, with respect to the direction of travel.

The cargo floor can be configured so that the cargo floor can be unlocked with only one hand of an operating person proceeding from the fastened state and can be removed from the vehicle. This is to be understood that the operating person need not perform any other supporting or holding motion sequences with an elbow, the other hand, or other aids.

In an exemplary embodiment of a cargo floor of the invention with three sections, the removal sequence can be as follows:

A rearmost, third section of the cargo floor is picked up with one hand.

The third section is folded with the second section into a Z-shape—in a so-called Z-fold—onto the first section, so that the second section comes to lie reversed by 180 degrees. This produces a locked intermediate state of the cargo floor.

A left and right locking member is pulled back one after the other with the hand in order to release the first section locked thus far.

The cargo floor stacked in a Z-shape is removed from the rear of the vehicle with one hand.

The insertion of the cargo floor can proceeds as follows:

The cargo floor stacked in a Z-shape is placed in the rear area with one hand, whereby the front, first section lies with its front edge specifically at a stop.

The third and second sections are unfolded with one hand. In so doing, the closure member can be actuated by the second section and the cargo floor can be automatically locked.

If the cargo floor after its insertion is to remain in the intermediate state, locking in this position is recommended. To this end, the closure members can be locked manually with the front section, without sections two and three having to be unfolded.

The invention relates, moreover, to a vehicle, particularly a motor vehicle, comprising at least one cargo floor of the invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
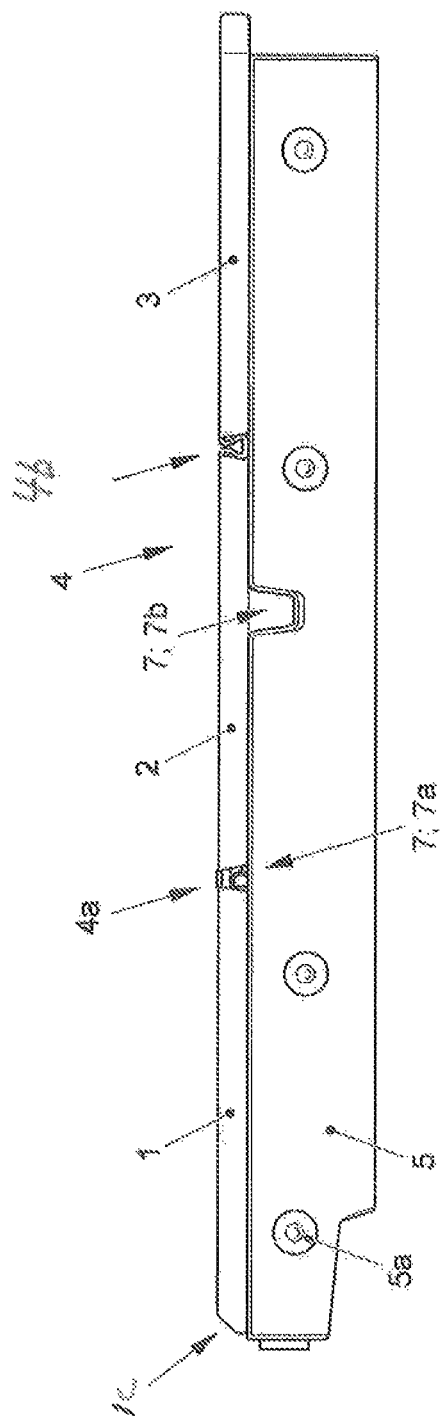
FIG. 1 shows a side elevational view of a cargo floor of the invention in a laid-down and locked state.

The cargo floor shown in FIG. 1 is arranged in a back cargo area of a passenger vehicle. This could be a motor vehicle with a notchback, hatchback, or some other body style.

The cargo floor includes a first front section 1, arranged in the present case in the direction of travel, a second section 2 arranged behind it in the direction of travel, and a third section 3 arranged rearmost in the direction of travel. The three sections 1, 2, 3 are each made as flat, intrinsically rigid elements. In the laid-down state of the cargo floor (FIG. 1), they are all located in the same plane, whereby the plane is oriented substantially horizontally.

In this state, the cargo floor forms the floor of the cargo area of the motor vehicle, so that pieces of luggage or other cargo can be placed on it.

Sections 1, 2, 3 each lie with their side edges on a left and right frame section 5. Frame section 5 is attached permanently via fastening points 5a immovably or rigidly to the body of the vehicle. The fixation of frame sections 5 to the body can occur using any method. In an alternative embodiment, frame sections 5 can also be formed of the same material integrally with the rest of the body.

Figure 5:
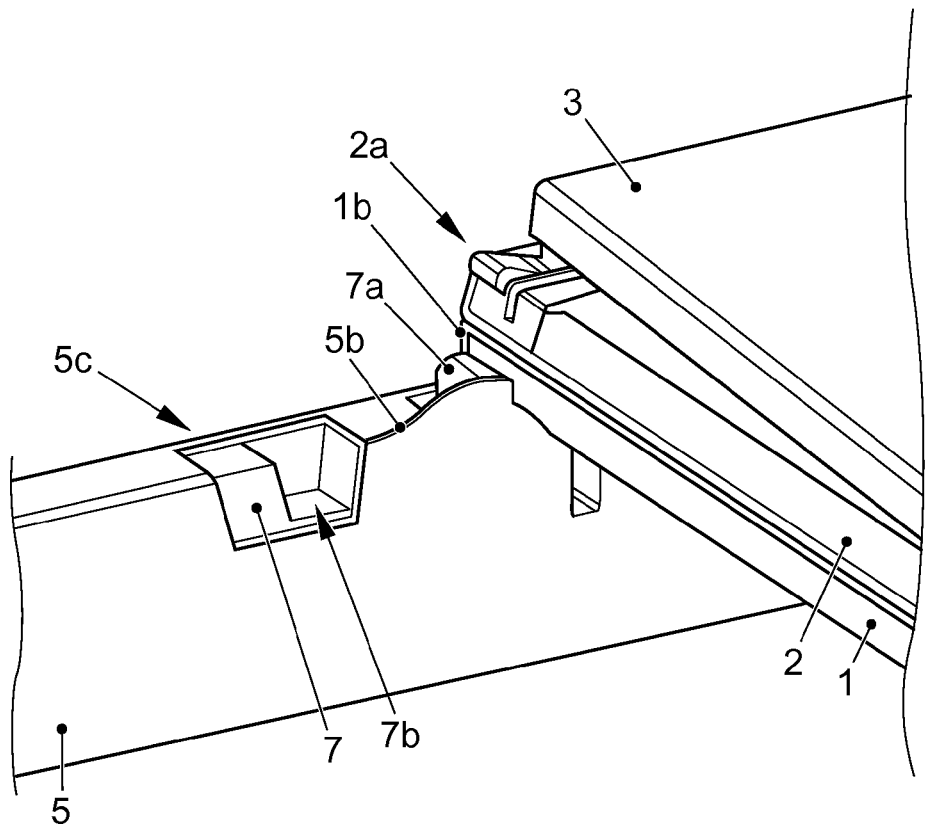
FIG. 5 shows a spatial detailed view of the cargo floor of FIG. 2.

To improve a positioning and mounting of front section 1, this section has a bevel 1c on its front edge, which interacts with a correspondingly formed stop (not shown) on the vehicle. Further, a guide 5b, which secures the first section against slipping backwards, is formed on frame section 5. In this regard, first section 1 can be pushed forward over frame section 5 until its back edge extends over guide 5b (see FIG. 5). However, bevel 1c and guide 5b do not bring about a complete mounting of the cargo floor, and in particular no securing against accelerations in the perpendicular direction.

A flexible floor cover 4 extends over all sections 1, 2, 3. Floor cover 4 in each case forms an integral hinge 4a, 4b at the boundaries between two sections.

The sections can be pivoted relative to one another via integral hinges 4a, 4b about axes extending transverse to the direction of travel. In this way, second section 2 can be placed reversed by 180°, therefore with its top side facing downward, on first section 1. Third section 3, which is optional within the context of the invention, comes to lie in its original orientation on second section 2. In this way, overall an intermediate state (see FIG. 2) is achieved, in which a space below the cargo floor is also accessible and in which the cargo floor is held immovable as in the laid-down state. This enables operation of the vehicle, without the cargo floor being able to move uncontrollably in the cargo area.

Figure 2:
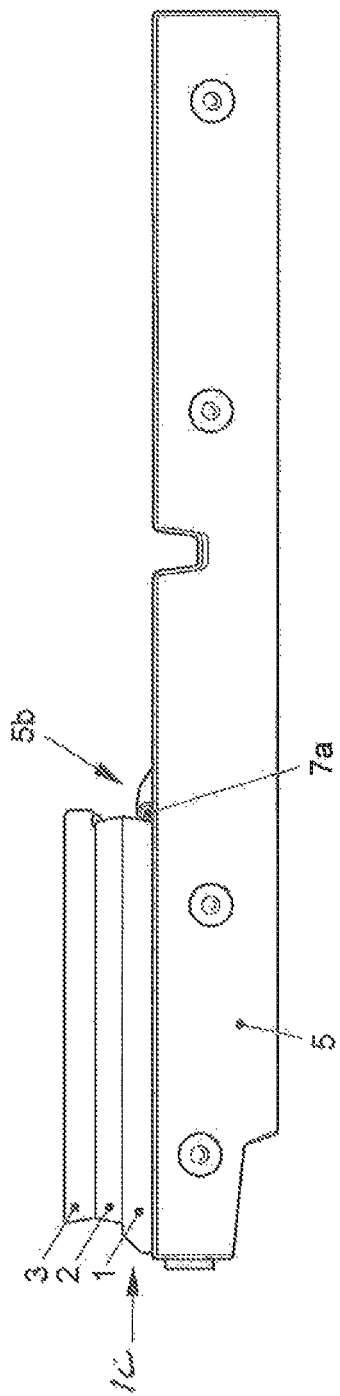
FIG. 2 shows the cargo floor of FIG. 1 in a locked intermediate state.

To this end, the cargo floor is locked releasably with frame sections 5, fixed to the body, both in the laid-down state according to FIG. 1 and in the intermediate state according to FIG. 2. This is achieved by a closure member 6. Closure member 6 is arranged in the area of the transition from first section 1 to second section 2, so that it can be readily reached from a rear access of the vehicle by an operating person. In the present case, a closure member is provided in a symmetric design on each side of the cargo floor, so that overall a pair of two closure members is present. Only one of the two closure members will be described in detail below.

It is understood that the closure member in further embodiments of the invention can also be arranged at a different position of the plurality of sections of the cargo floor.

Within the context of the invention, the closure member works together with a section of the cargo floor to which another section of the completely unfolded cargo floor is attached in the rear or opposite to the direction of travel. The first section working together with the closure member can be a frontmost section of the cargo floor, as in the present example. In embodiments of the invention, which represent an alternative to this, however, another section can also be provided in front of the first section in the direction of travel.

Figure 6:
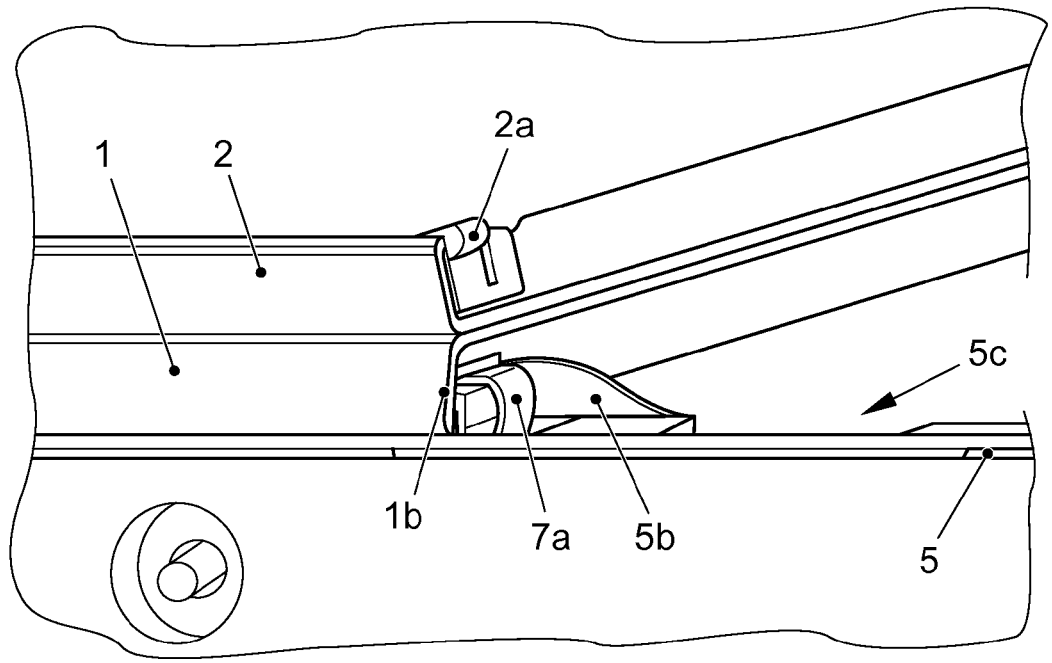
FIG. 6 shows the detailed view of FIG. 5 from a different spatial perspective.

Closure member 6 comprises a locking member 7, which is arranged in a guiding receptacle 5c on frame section 5 and is guided linearly movable within it. Locking member 7 can be pushed into a first position, in front in the direction of travel (see FIG. 3, FIG. 5, FIG. 6), in which the cargo floor is locked to the vehicle. In a second rear position (see FIG. 4) of the locking member, the cargo floor is released for removal from the vehicle.

This is achieved in that the locking member 7 has a hook-shaped retaining section 7a. Retaining section 7a projects upwardly over a supporting surface of frame section 5. Depending on the position of locking member 7, retaining section 7a either engages or does not engage in a lateral, profiled edge 1b of front section 1. A corresponding receptacle 1a for interacting with retaining section 7a is provided in edge 1b of section 1.

In the present case, retaining section 7a and receptacle 1a comprise projecting formations 8, by means of which a springy latching of the locking member in its locked position is achieved. The locking member is hereby held in its locked position by a latching force against vibrations and smaller forces arising during driving.

Locking member 7, moreover, comprises a formation 7b for manual operation by an operating person. Formation 7b is formed as a recess open on one side, into which the operating person can reach with a finger in order to pull locking member 7 back or to push it forward.

Figure 7:
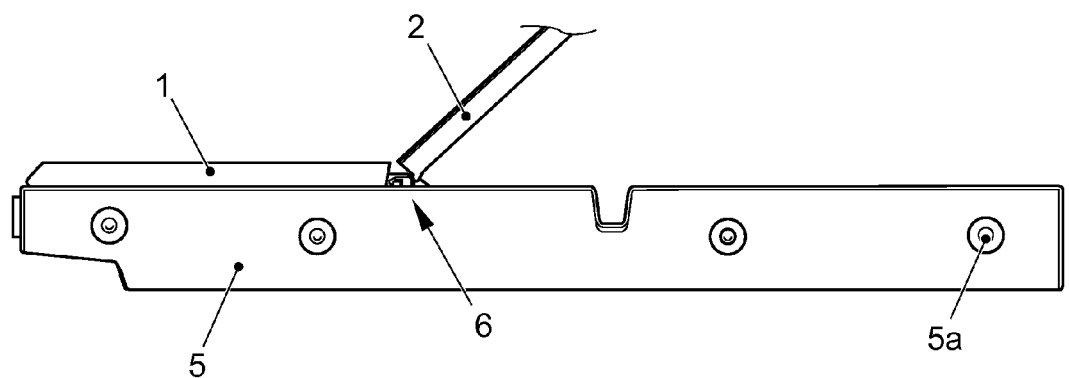
FIG. 7 shows a side elevational view of the cargo floor of FIG. 1 during a pivoting movement during the laying down of the cargo floor.
Figure 8:
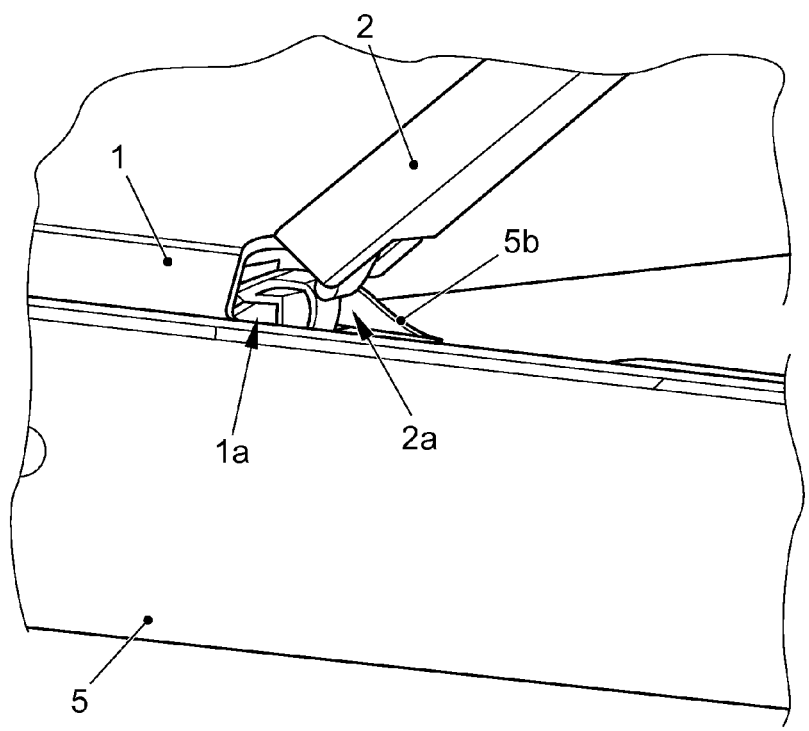
FIG. 8 shows a spatial detailed view of the cargo floor of FIG. 7.
Figure 9:
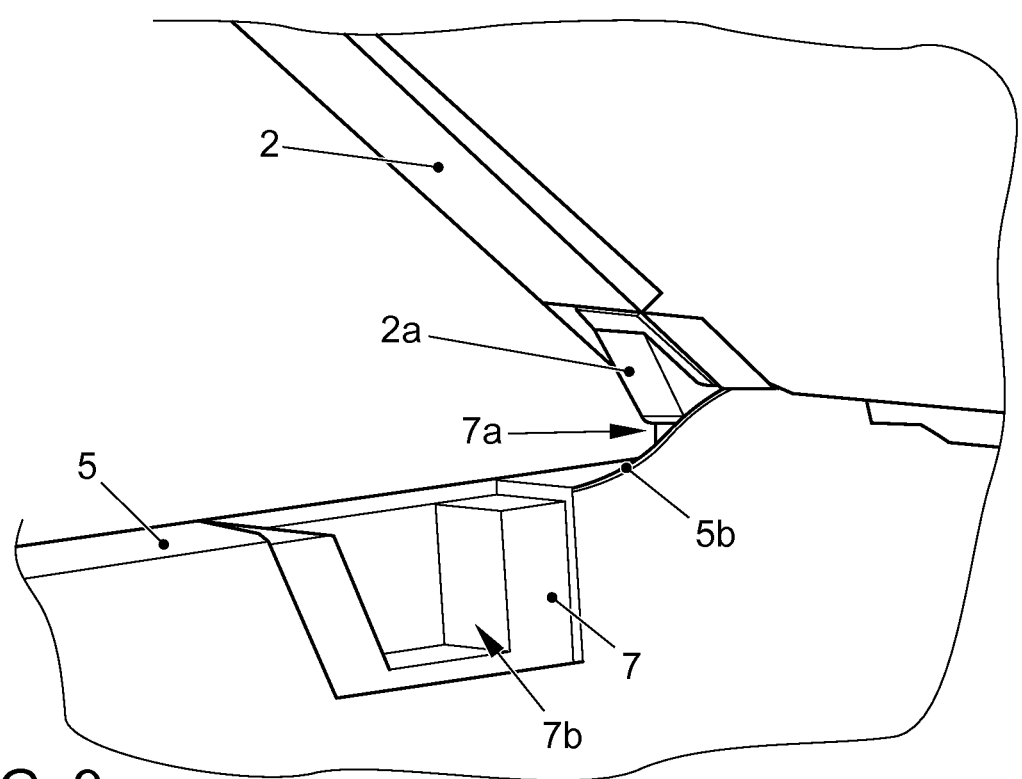
FIG. 9 shows the detailed view of FIG. 8 from a different spatial perspective.

Apart from such a manual actuation, an automatic locking of closure member 6 occurs by the laying down of the cargo floor in the luggage area, if second section 2 is unfolded. A half-pivoted position of the second section is shown in FIG. 7 to FIG. 9, whereby the locking member is already pushed partially but not yet completely into the locked position.

A coupling element 2a is located on second section 2 for the automatic actuation of locking member 7. Coupling element 2a has the shape of a cam projecting over the surface of the second section. Coupling element 2a is arranged in the area of a front edge of the second section.

Figure 4:
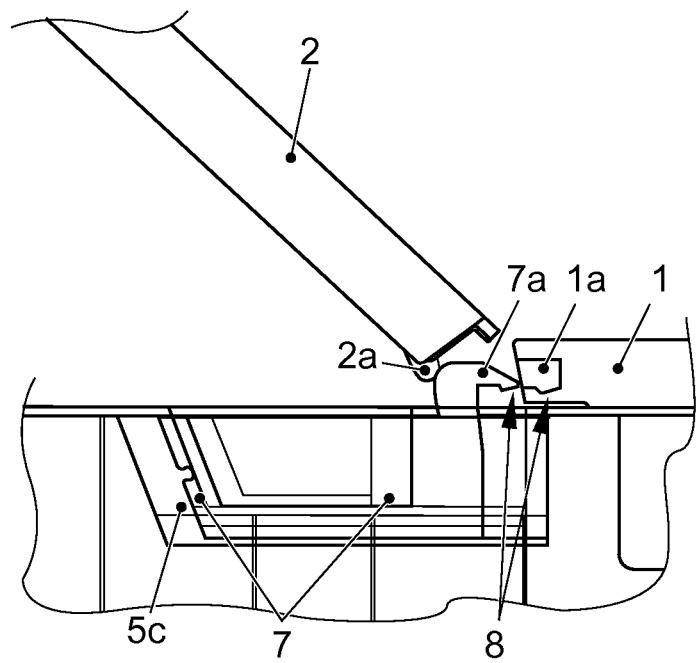
FIG. 4 shows the closure member of FIG. 3 in an unlocked state.

During the pivoting of second section 2 into the laid-down position, coupling element 2a first strikes a back of retaining section 7a of locking member 7 (see, for instance, FIG. 4). With further pivoting of second section 2, locking member 7 is then pushed forward by coupling element 2a (see FIG. 7 to FIG. 9), until finally locking member 7 is pushed into the front end position.

Figure 3:
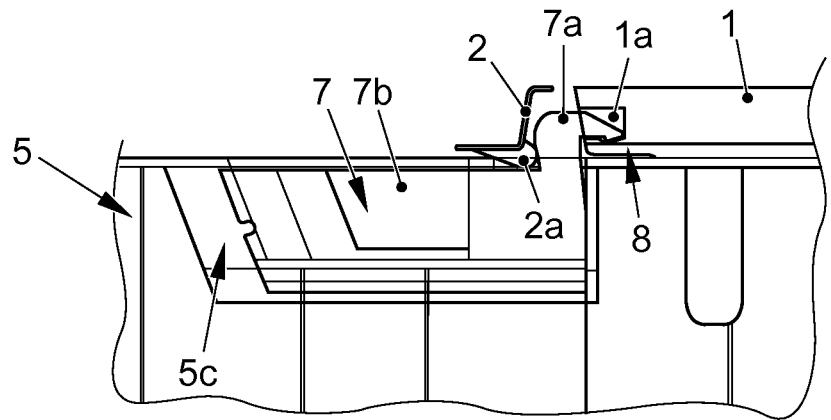
FIG. 3 shows a schematic side view of a closure member of the cargo floor of FIG. 1 in a locked state.

It is noted that the floor covering connecting sections 1, 2 is not shown in FIG. 3 and FIG. 4 for reasons of clarity. However, the shown parts of sections 1, 2 are positioned to one another as if they were connected by the floor covering.

In the laid-down position, coupling element 2a, moreover, forms a further securing against a backward movement of the locking member into an opened position.

An exemplary embodiment of the invention functions as follows:

Proceeding from a removed state of the cargo floor, the cargo floor stacked in a Z-shape is placed in the rear area with one hand, whereby the front, first section 1 lies specifically with its front edge against a stop.

Then, third section 3 and second section 2 are unfolded with one hand. In so doing, closure member 6 is actuated by second section 2 in that coupling element 2a pushes locking member 7 forward. The cargo floor is automatically locked hereby.

If the cargo floor after its insertion is to remain in the intermediate state stacked in a Z-shape, locking in this position is to be recommended. To this end, locking member 7 can be locked manually by the operating person, without the second and third section 2, 3 having to be unfolded.

If the cargo floor is to be removed, the sequence is as follows:

The rearmost third section 3 of the cargo floor is lifted up with one hand and is folded with second section 2 into a Z-shape onto first section 1, so that second section 2 comes to lie reversed by 180 degrees. This leads to the locked intermediate state of the cargo floor.

Locking members 7 are then pulled back one after the other with one hand to release the thus far locked first section 1. The cargo floor stacked in a Z-shape is then removed with one hand from the rear area of the vehicle.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A cargo floor for a vehicle comprising:
a first section;
at least one second section that is arranged behind the first section in a direction of travel of the vehicle, the second section being connected to the first section in an articulated manner and pivotable about an axis; and
a closure member, wherein at least one part of the cargo floor is releasably fastened via the closure member to the vehicle,
wherein the cargo floor in an unlocked state of the closure member is removable from the vehicle,
wherein the first section and the second section in a fastened state are arranged in a same plane, and
wherein the first section of the cargo floor is lockable via the closure member.

2. The cargo floor according to claim 1, wherein one closure member is provided on each side of the cargo floor.

3. The cargo floor according to claim 1, wherein the first section is brought into a laid-down position or is removed from said position, while at least the second section in a folded position lies on the first section.

4. The cargo floor according to claim 1, wherein a coupling element interacting with the closure member is arranged on the second section.

5. The cargo floor according to claim 1, wherein the closure member comprises a linearly movable locking member.

6. The cargo floor according to claim 5, wherein the locking member has a catch for a manual sliding of the locking member by an operating person.

7. The cargo floor according to claim 5, wherein the locking member has a retaining section, which in a fastened state meshes with one of the cargo floor sections.

8. The cargo floor according to claim 5, wherein the locking member is held via a latching force in at least one end position.

9. The cargo floor according to claim 5, wherein a force is applied via a spring to the locking member in one direction.

10. The cargo floor according to claim 5, wherein the cargo floor lies on at least one frame section fixed to the vehicle body, and wherein the locking member is taken up in the frame section.

11. The cargo floor according to claim 1, wherein the cargo floor is unlocked by only one hand of an operating person proceeding from the fastened state and removed from the vehicle.

12. A vehicle comprising a cargo floor according to claim 1.

* * * * *